Oct. 15, 1968
F. A. SATTLER
3,406,045
CROSS-LINKED POLYETHYLENE TEREPHTHALATE OVERCOAT
FOR INSULATED ELECTRICAL CONDUCTORS
Filed Sept. 16, 1964
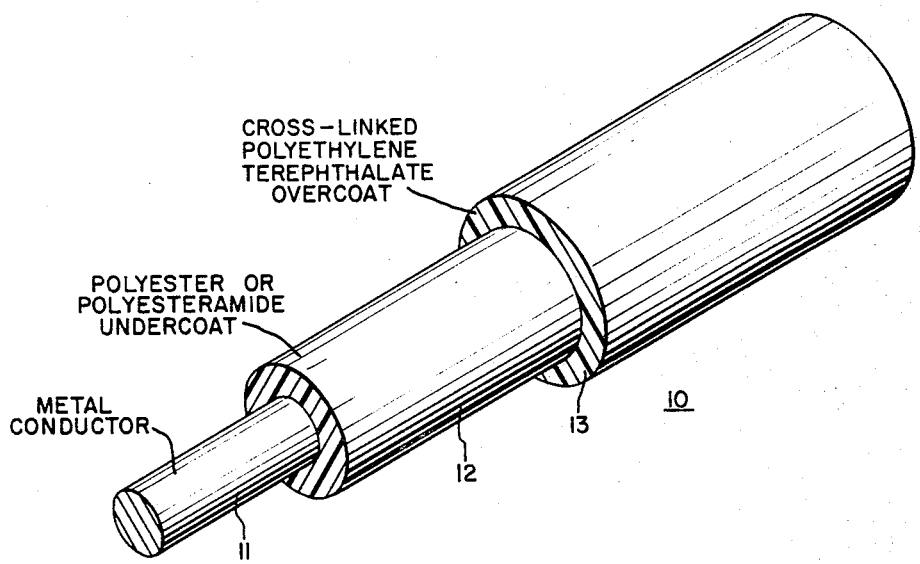
INVENTOR
Frank A. Sattler
BY *Alex Mich, Jr.*
ATTORNEY United States Patent Office 3,406,045
Patented Oct. 15, 1968

3,406,045
CROSS - LINKED POLYETHYLENE TEREPHTHALATE OVERCOAT FOR INSULATED ELECTRICAL CONDUCTORS
Frank A. Sattler, Monroeville, Pa., assignor to Westinghouse Electric Corporation, East Pittsburgh, Pa., a corporation of Pennsylvania
Filed Sept. 16, 1964, Ser. No. 396,910
4 Claims. (Cl. 117—218)

ABSTRACT OF THE DISCLOSURE

Nonlinear polymeric overcoating compositions are prepared from filamentary polyethylene terephthalate and specific minor amounts of a polyol having at least three hydroxyl groups, certain anhydrides and/or certain polymeric reaction products of polyols with acid components. The polymeric overcoating compositions are applied over metal conductors insulated with phthalic acid polyesters or phthalic acid polyesteramides.

This invention relates generally to resinous insulating films. More particularly, this invention relates to resinous wire enameling compositions and electrical conductors insulated therewith.

Polyester and polyesteramide resinous insulating compositions have long been employed to provide thin resinous insulating films on electrical conductors. Most recently, polyester, polyesteramide and modifications thereof, derived from the reaction of isophthalic acid and the lower dialkyl esters of isophthalic and terephthalic acids with polyols such as ethylene glycol, glycerol and mixtures thereof and the like have been widely used because of excellent properties, particularly thermal stability or thermal life.

The thermal stability or thermal life is particularly good when large proportions of the polyol are materials having three or more hydroxyl groups. When these proportions are employed, however, the extensive cross-linking makes other properties, e.g., flexibility or elongation and heat shock, marginal. Attempts have been made to improve these marginal properties with varying success. An improvement in flexibility is attained, for example, by employing blends of high and low functionality polyester in accordance with the principles described in U.S. application Ser. No. 389,330, filed Aug. 13, 1964, now U.S. Patent 3,345,429, assigned to the assignee of this invention.

Overcoating the cross-linked polyesters with thin films of linear polyester resinous materials have been successful but the coating solutions must have a low solids content to prevent the solids from crystallizing. Those skilled in the art will also appreciate that entirely linear polymers are more plastic than nonlinear polymers and will be more apt to flow at cross-over points where mechanical loads are impressed on the films.

Accordingly, it is the general object of this invention to provide an overcoating film of a non-linear polyester resin to improve the flexibility and heat shock of cross-linked polyester and polyesteramide film insulated electrical conductors.

Another object of this invention is to provide nonlinear polyester overcoating compositions which may be coated over cross-linked polyester and polyesteramide films from stable non-crystallizing solutions.

Other objects of the invention will, in part, be obvious and will, in part, appear hereinafter.

Briefly, the present invention accomplishes the above cited objects by reacting linear filamentary polyethylene terephthalate resins with certain cross-linking materials such as polyols with three or more hydroxyl groups, certain anhydrides or certain reactive highly functional polymeric reaction products and providing solutions of the nonlinear reaction product from which overcoating films may be conveniently deposited. Cold blended solutions of the polyethylene terephthalate resin and the reactive highly functional polymeric reaction product may also be employed as overcoating solutions, the cross-linking taking place when the overcoat film is cured in the enameling tower.

For a more complete understanding of the present invention, reference may be had to the accompanying drawing, in which, the figure is a fragmentary isometric view illustrating an electrical conductor insulated in accordance with this invention.

It has now been discovered that the flexibility and heat shock properties of electrical conductors insulated with isophthalate and terephthalate polyester and polyesteramide coatings may be improved by employing a cured overcoating of certain nonlinear polymeric resins. The nonlinear polymeric resins are prepared by reacting (1) a linear filamentary polyethylene terephthalate resin with (2) at least one cross-linking material selected from the group consisting of (A) from 2 to 9%, by weight of reactants, of a polyol having at least three hydroxyl groups, (B) from 2 to 5%, by weight, of an anhydride selected from the group consisting of pyromellitic dianhydride, trimellitic anhydride and benzophenone tetracarboxylic dianhydride and (C) from 5 to 20%, by weight, of a polymer consisting essentially of the reaction product of about equimolar amounts of (a) a polyol having at least three hydroxyl groups with (b) at least one compound selected from the group consisting of dimethylterephthalate, isophthalic acid, benzophenone tetracarboxylic dianhydride and pyromellitic dianhydride.

The polyethylene terephthalate resin employed in this invention may be derived from ethylene glycol and terephthalic acid in accordance with procedures known in the art and described, for example, in U.S. 2,465,319, U.S. 2,650,213, British 578,079 and British 599,097. These esters of terephthalic acid and glycols must be sufficiently polymerized to have fiber forming or filamentary properties. Suitable materials are commercially available under proprietary names, as for example Dacron.

The filamentary polyethylene terephthalate resin and the described cross-linking materials are heated in a solvent such as a mixture of phenol, p-chlorophenol and o-cresol to dissolve the filamentary resin and to form the nonlinear modified polyethylene terephthalate overcoating resin. The reaction rate is typically dependent on time and temperature, neither of these conditions being critical but lower temperatures requiring longer periods of time. Temperatures from about 90° C. to refluxing for periods from 6 to 20 hours may be employed. Nitrogen sparging and stirring during the reaction are advantageous.

In addition to the foregoing nonlinear polyethylene terephthalate reaction product, a blended solution of the described filamentary polyethylene terephthalate together with from 5 to 20%, by weight of total solids, of the reaction product of equimolar amounts of (a) a polyol having at least three hydroxyl groups with (b) at least one compound selected from the group consisting of dimethylterephthalate, isophthalic acid, pyromellitic dianhydride, benzophenone tetracarboxylic dianhydride and trimellitic anhydride, may be employed as an overcoating. In this composition, the blended solution is deposited on the electrical conductor and cured on the conductor to produce a nonlinear polyethylene terephthalate deposit. Examples of suitable polyol compounds with at least three hydroxy groups that are suitable for use in the blended solution, and the component 2(A) described hereinabove, are glycerol, trimethylolethane, trimethylol propane, pentaerythritol, tris(2-hydroxyethyl)isocyanurate and mixtures thereof.

Solutions of the described modified nonlinear polyethylene terephthalate reaction product or the described blends are employed in overcoating the isophthalate or terephthalate polyester or polyesteramide insulated wire either by dip coating, die coating or like techniques. A split-pan set up may be conveniently employed in standard enameling towers to continuously produce the dual coated wire. The thermosetting isophthalate or terephthalate polyester or polyesteramide enamel is placed in one part of the split-pan, the overcoating enamel of this invention is placed in the other part of the split-pan and multiple passes may be made through each part of the pan, the deposit being cured after each pass and before the next wet film is deposited.

In order to illustrate the invention and the advantages attendant thereto even more fully, the following specific examples are set forth.

EXAMPLE I

| Ingredient | Moles | Grams |
| --- | --- | --- |
| Part A: | | |
| Glycerol | 1.20 | 110.3 |
| Ethylene glycol | 0.76 | 47.2 |
| Isophthalic acid | 1.80 | 299.0 |
| Part B: | | |
| Urea | 0.20 | 12.0 |
| Isophthalic acid | 0.20 | 33.2 |

The ingredients of Part A, together with 20 milliliters of m,p-cresol, are charged into a 2-liter, 4-neck reaction flask equipped with a motor stirrer, thermometer, nitrogen sparge tube and air condenser. With stirring and nitrogen sparging, the ingredients are heated from 180° C. to 235° C. at a rate of 15° C. per hour until a thread-forming stage is reached. The ingredients of Part B, together with 100 milliliters of m,p-cresol, are added and the reaction is continued at 200° C. to 225° C. until a second thread-forming stage is reached. One hundred milliliters of m,p-cresol are added and the reaction is continued at 215° C. until a third thread-forming stage is reached. At this point, 200 milliliters of cresylic acid and 74.0 grams of cobalt naphthenate (6% cobalt) are added and the reaction is continued for five minutes at 185° C. The solution is further diluted with 300 milliliters of cresylic acid and 500 milliliters of an aromatic hydrocarbon having a boiling range of 154 to 177° C. The grams of an antioxidant, 2,2'-methylene bis(4-methyl-6-tertiary butyl phenol) (American Cyanamid Antioxidant 2246), are also added. This solution is die-coated on No. 17 AWG copper wire to a build of 2.8 to 3.2 mils with six passes through a fifteen foot vertical enameling tower at a hot spot temperature of 430° C. Standard tests on flexibility and heat shock resistance are summarized in Table I hereinbelow so that the properties of wires insulated in the following examples, insulated in accordance with this invention, may be conveniently compared with the properties of wires of this example insulated in accordance with the prior art. It will be apparent that the flexibility and heat stock resistance of the sample prepared in this Example I are acceptable but a comparison with the overcoated samples will reveal a surprising improvement in both of these properties.

EXAMPLE II

Ingredient: Grams
Polyethylene terephthalate fibers _____ 273.4
Glycerol _____ 6.6

The foregoing ingredients, together with 252 grams of p-chlorophenol, 504 grams of phenol, 504 grams of o-cresol and 0.25 gram of lead acetate, were charged into a 2-liter reaction vessel equipped as in Example I. With nitrogen sparging and stirring, the ingredients are heated to 100° C., then heated to 175° C. at a rate of 10° C. per hour. The reaction product is cooled and filtered. With a split-pan set up, No. 17 AWG copper wire is first coated with four passes through the enameling solution of Example I to a build of 2.0 mils. With two passes through the reaction product solution described in this example, an overall build of 3.0 mils is attained. From the summary of properties in Table I, it is apparent that a pronounced improvement in flexibility and heat shock resistance is attained with the overcoat of this invention.

EXAMPLE III

Ingredient: Grams
Polyethylene terephthalate fibers _____ 255.6
Glycerol _____ 24.4

The foregoing ingredients, together with 252 grams of p-chlorophenol, 504 grams of phenol, 504 grams of o-cresol and 0.25 gram of lead acetate are charged into a 2-liter reaction flask equipped as in Example I. With nitrogen sparging and stirring, the ingredients are heated to 100° C,. then heated to 175° C. at rate of 10° C. per hour. The reaction product is cooled and filtered. Two passes of this enamel (1.0 mil build) are die-coated over four passes of the enamel described in Example I (2.0 mils build). Referring to the summary of test results in Table I, a marked and surprising improvement in flexibility and heat shock resistance is again noted.

EXAMPLE IV

| Ingredient | Moles | Grams |
| --- | --- | --- |
| Part A: | | |
| Glycerol | 1.05 | 96.7 |
| Ethylene glycol | 0.54 | 33.5 |
| 1,4-butanediol | 0.525 | 47.3 |
| Dimethylterephthalate | 0.25 | 48.5 |
| Isophthalic acid | 1.6 | 266.0 |
| Part B: | | |
| Urea | 0.15 | 9.0 |
| Isophthalic acid | 0.15 | 24.9 |

The ingredients of Part A, together with 20 milliliters of cresol and 1.5 grams of isopropyl titanate, are charged into a 2-liter reaction flask equipped as in Example I. With nitrogen sparging and stirring, the charge is rapidly heated to 180° C., the temperature thereafter being raised at a rate of 15° C. per hour to a temperature of 230° C. where a thread-forming stage is reached. The ingredients of Part B, together with 100 milliliters of m,p-cresol, are added and the reaction is continued at a temperature of about 200° C. to 215° C. until a second thread-forming stage is reached. An additional 100 milliliters of m,p-cresol are added and the reaction is continued at 210° C. to a third thread-forming stage. At this point, 200 milliliters of cresylic acid and 55.5 grams of cobalt naphthenate (6% cobalt) are added and the reaction is continued for five minutes at 185° C. The solution is diluted with 300 milliliters of cresylic acid and 500 milliliters of an aromatic hydrocarbon having a boiling range of 154–177° C. Two grams of the antioxidant described in Example I are added. The solution is die-coated to a heavy build (3 mils) on No. 17 AWG copper wire. From the summary of results in Table I, it is apparent that this insulating coating, prepared in accordance with principles known heretofore in the art, has good flexibility but fails the heat shock test at 150° C.

EXAMPLE V

Ingredient— Grams
Part A:
    Glycerol _____ 184.2
    Dimethylterephthalate _____ 388.2
Part B:
    Part A solution (62.5 grams solids) ____ 122.0
    Polyethylene terephthalate fibers _____ 250.0

The ingredients of Part A, together with 10 milliliters of xylene, 100 milliliters of m,p-cresol and 3.0 grams of isopropyl titanate, are charged into a 2-liter reaction flask equipped as in Example I. With nitrogen sparging and stirring, the charge is heated to 180° C., and then raised to 210° C. at a rate of 10° C. per hour to a thread-forming stage. After the addition of 100 milliliters of cresylic acid, the reaction is continued at 200° C. to a second thread-forming stage. This reaction product solution is diluted with 300 milliliters of cresylic acid and employed as outlined hereinbelow.

The ingredients of Part B, including the indicated portion of the Part A reaction product, together with 750 grams of cresylic acid, is charged to a second reaction flask equipped as in Example I. With nitrogen sparging and stirring, the batch is heated at 190° C. for five hours. The reaction product solution is thinned with 400 milliliters of cresylic acid. This non-linear polyethylene terephthalate reaction product solution is employed to provide an overcoat (two passes—1 mil build) over an undercoating derived from the solution of Example IV (four passes—2 mil build). The procedures and enameling equipment heretofore described are employed to coat No. 17 AWG copper wire. The summary of results in Table I shows a marked improvement in heat shock resistance attributable to the novel overcoat of this invention.

EXAMPLE VI

Ingredient— Grams
Part A:
    Glycerol _____ 595.2
    Dimethylterephthalate _____ 1241.6
Part B:
    Ethylene glycol _____ 286.4
    Glycerol _____ 237.6
    Dimethylterephthalate _____ 1241.6

The ingredients outlined in Part A, together with 331 grams of m,p-cresol, 41.6 grams of xylene and 9.6 grams of isopropyl titanate, are charged to a 5-liter reaction flask equipped with a stirrer, thermometer, nitrogen sparge tube and steam condenser. With nitrogen sparging and stirring, the ingredients are heated rapidly to 180° C. and then to 220° C. at a rate of 10° C. per hour to a thread-forming stage. At this point, 331 grams of m,p-cresol are added and the reaction is continued at 210° C. to a second thread-forming stage at which point 1500 grams of cresylic acid and 1500 grams of an aromatic hydrocarbon having a boiling range of 154–177° C. are added. This reaction product is retained and employed in conjunction with the reaction product of Part B, as outlined hereinbelow.

The ingredients of Part B, together with 66.4 grams of m,p-cresol, 41.6 grams of xylene and 1.6 grams of lead acetate, are charged to a 5 liter reaction flask equipped as in Part A, hereinabove. With nitrogen sparging and stirring, the charge is heated to 180° C., then to 275° C. at a rate of 15° C. per hour. At this point, a thread-forming stage is reached and 331 grams of m,p-cresol are added. The reaction is continued at 235° C. to a second thread-forming stage when 662 grams of cresylic acid and 236.8 grams of cobalt naphthenate (6% cobalt) are added. The reaction is continued for five minutes at 185° C. and the solution is further diluted with 800 grams of cresylic acid and 750 grams of an aromatic hydrocarbon having a boiling range of 154° C.–177° C., together with 6.0 grams of the antioxidant described in Example I.

Part A and Part B are blended together and coated on No. 17 AWG copper wire to a heavy build (3 mils), in accordance with procedures and with equipment described hereinabove. From the summary of test results in Table I, it is apparent that this insulating coating, prepared in accordance with principles heretofore known in the art, has a low flexibility and only a fair heat shock resistance.

EXAMPLE VII

Ingredient— Grams
Part A:
    Benzophenone tetracarboxylic dianhydride _____ 113.8
    Pentaerythritol _____ 48.7
Part B:
    Polyethylene terephthalate fibers _____ 650

The ingredients of Part A, together with 228 grams of cresylic acid, are charged to a 1000 milliliter beaker. With constant stirring, the ingredients are heated to 100° C. and then to 145° C. at a rate of 10° C. per hour. An addition of 260 milliliters of cresylic acid is made and the resulting solution is cooled to room temperature. The solution, which contains 25.6% of non-volatile solids, is employed in the blend described hereinbelow.

The polyethylene terephthalate fibers of Part B together with 3190 grams of cresylic acid are charged into a 2 liter reaction flask equipped with a motor stirrer, nitrogen sparge tube, air condenser and thermometer. The charge is heated to 100° C., then to 160° C. at a rate of 10° C. per hour. At this point, 798 grams of p-chlorophenol are added and the solution is cooled. This solution contains 14.0% of non-volatile solids and is employed in the blend described hereinbelow.

The solutions of Parts A and B are blended together at room temperature and die-coated (two passes—1 mil build) over the coatings of the solution of Example VI (four passes—2 mils build) on No. 17 AWG copper wire, in accordance with procedures and employing equipment described hereinabove. From the summary of properties in Table I, it is apparent that the overcoat of this invention provides an improvement in flexibility and heat shock resistance.

EXAMPLE VIII

A solution is prepared in accordance with the instructions outlined in Part B of Example VII. To this solution is added 141 grams of a solution identical to that outlined in Part A of Example V. This blended solution is die-coated on No. 17 AWG copper wire (two passes—1 mil build) over a coating (four passes—2 mils build) of the solution described in Example VI, employing methods and equipment described hereinabove. From the summary of results in Table I, it is again apparent that the combination coating of this invention provides a definite improvement in flexibility and heat shock resistance.

TABLE I.—PROPERTIES OF WIRE ENAMEL COMBINATIONS ON #17 A.W.G. COPPER WIRE, HEAVY BUILD

| Example No. | | Coating | Build, mils | Bake [1] (ft.) | Flexibility or elongation passing 1X mandrel, percent | Heat shock [2] temp. passing 1X (° C.) |
|---|---|---|---|---|---|---|
| I | 3656 | Single coat | 3.0 | 19 | 25 | 150 |
|   |      |             |     | 22 | 25 | 150 |
| II | 3839 | Overcoat | (1.0) | 19 | 30+ | 200 |
|    | 3656 | Undercoat | (2.0) | 22 | 30+ | 200 |
| III | 3841 | Overcoat | (1.0) | 19 | 30+ | 200 |
|     | 3656 | Undercoat | (2.0) | 22 | 30+ | 200 |
| IV | 3864C | Single coat | 3.0 | 19 | 30+ | 125 |
|    |       |             |     | 22 | 30+ | 125 |
| V | 3891 | Overcoat | (1.0) | 19 | 30+ | 200 |
|   | 3864C | Undercoat | (2.0) | 22 | 30+ | 200 |
| VI | 2972 | Single coat | 3.0 | 22 | 10 | 150 |
|    |      |             |     | 25 | 15 | 150 |
| VII | 3960 | Overcoat | (1.0) | 22 | 20 | 175 |
|     | 2972 | Undercoat | (2.0) | 25 | 20 | 175 |
| VIII | 3971 | Overcoat | (1.0) | 22 | 20 | 200 |
|      | 2972 | Undercoat | (2.0) | 25 | 20 | 200 |

[1] Bake is speed in ft./min. through a 15-foot tower at a hot spot temperature of 430° C.
[2] Heat shock passing 1X mandrel measured in 25° C. increments.

It should be noted that the heat shock test consists of winding a coil about a conical mandrel or a mandrel having various diameters, the smallest being the same as the diameter of the wire being tested, and placing the coil in an oven at various elevated temperatures beginning at 100° C. and increasing in 25° C. increments. Samples which show no evidence of failure, i.e. cracking, fissuring and the like, at a given temperature are considered satisfactory. The maximum temperature at which a sample shows no failure when wound around the 1X diameter mandrel is reported. In the flexibility or elongation test, a sample is first elongated, then wrapped around a 1X mandrel and examined for coating failures. The maximum elongation at which a sample shows no failure when wound around the 1X mandrel is reported. It should be understood that the improved flexiblity and heat shock resistance of the overcoated wire of this invention is attained with no sacrifice in other significant properties such as thermal endurance or thermal life, electric strength, abrasion resistance and the like.

Referring now to the single figure of the drawing, there is illustrated an insulated wire 10, overcoated in accordance with this invention. A conductor 11 composed of metal such as copper, silver, or aluminum has a first applied coating 12 of an isophthalate or terephthalate thermoset polyester or polyesteramide resin. A second coat or overcoat 13 of the non-linear polyethylene terephthalate resin of this invention is applied over the coating 12. The relative thickness of the overcoat and undercoat may vary considerably but the overcoat should be thinner than the undercoat. On a heavy coated wire where the total build is about 3 mils, the overcoat may be from about 0.2 to 1 mil thick. On a single coated wire, where the total build is about 2 mils, the same proportion of relative thicknesses may be maintained.

Examples of isophthalate or terephthalate polyester, polyesteramide resins and modifications of such basic resins suitable for use in combination with the non-linear polyethylene terephthalate resins in accordance with this invention are well known in the art. The phthalic acid polyesters described, for example, in U.S. Patents 3,009,-896, 2,889,304, 2,936,296, and 2,982,754, may be employed as undercoatings as well as the phthalic acid polyesteramides described in U.S. application Ser. No. 227,-490 filed Oct. 1, 1962, now U.S. Patent No. 3,361,593, and assigned to the assignee of this invention.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim:

1. An insulated electrical conductor comprising a metal conducting member having a resinous insulating film applied thereto, the insulating film comprising a first coating of a cured thermoset resinous polymer selected from the group consisting of isophthalic and terephthalic acid polyesters and polyesteramides and a second coating of a cured non-linear resinous polymer deposited over said first coating, the non-linear polymer consisting essentially of the reaction product of (1) a linear filamentary polyethylene terephthalate resin with (2) at least one cross-linking material selected from the group consisting of (A) from 2 to 9 percent, by weight, of a polyol having at least three hydroxyl groups, (B) from 2 to 5 percent, by weight, of an anhydride selected from the group consisting of pyromellitic dianhydride, trimellitic anhydride and benzophenone tetracarboxylic dianhydride and (C) from 5 to 20 percent, by weight, of a polymer consisting essentially of the reaction product of about equimolar amounts of (a) a polyol having at least three hydroxyl groups with (b) at least one compound selected from the group consisting of dimethylterephthalate, isophthalic acid, pyromellitic dianhydride, benzophenone tetracarboxylic dianhydride and trimellitic anhydride.

2. An insulated electrical conductor comprising a metal conducting member having a resinous insulating film applied thereto, the insulating film comprising a first coating of a cured thermoset resinous polymer selected from the group consisting of isophthalic and terephthalic acid polyesters and polyesteramides and a second coating of a cured nonlinear resinous polymer deposited over said first coating, the nonlinear polymer consisting essentially of the reaction product of (1) a linear filamentary polyethylene terephthalate with (2) from 2 to 9 percent, by weight, of a polyol having at least three hydroxyl groups.

3. An insulated electrical conductor comprising a metal conducting member having a resinous insulating film applied thereto, the insulating film comprising a first coating of a cured thermoset resinous polymer selected from the group consisting of isophthalate or terephthalate polyesters and polyesteramides and a second coating of a cured nonlinear resinous polymer deposited over said first coating, the nonlinear polymer consisting essentially of the reaction product of (1) a linear filamentary polyethylene terephthalate resin and (2) from 2 to 5 percent, by weight, of an anhydride selected from the group consisting of pyromellitic dianhydride, trimellitic anhydride and benzophenone tetracarboxylic dianhydride.

4. An insulated electrical conductor comprising a metal conducting member having a resinous insulating film applied thereto, the insulating film comprising a first coating of a cured thermoset resinous polymer selected from the group consisting of isophthalate or terephthalate polyesters and polyesteramides and a second coating of a cured nonlinear resinous polymer deposited over said first coating, the non-linear polymer consisting essentially of the reaction product of (1) a linear filamentary polyethylene terephthalate resin and (2) from 5 to 20 percent, by weight, of a polymer consisting essentially of the reaction product of about equimolar amounts of (a) a polyol having at least three hydroxyl groups and (b) at least one compound selected from the group consisting of dimethylterephthalate, isophthalic acid, pyromellitic dianhydride, benzophenone tetracarboxylic dianhydride and trimellitic anhydride.

References Cited

UNITED STATES PATENTS

| | | | |
|---|---|---|---|
| 2,523,999 | 9/1950 | Sattler et al. | 117—75 X |
| 2,889,304 | 6/1959 | Sheffer et al. | 117—232 X |
| 2,936,296 | 5/1960 | Precopio et al. | 117—232 |
| 3,070,256 | 12/1962 | Bremmer et al. | 117—75 X |
| 3,161,541 | 12/1964 | Holub | 117—232 |
| 3,240,626 | 3/1966 | Olson et al. | 117—232 X |
| 3,296,335 | 1/1967 | Blaschke | 260—860 |
| 3,312,573 | 4/1967 | Sheffer | 117—218 |

WILLIAM D. MARTIN, *Primary Examiner.*

R. HUSACK, *Assistant Examiner.*